US012409687B2

(12) United States Patent
Zong et al.

(10) Patent No.: US 12,409,687 B2
(45) Date of Patent: Sep. 9, 2025

(54) TIRE CHANGER (71) Applicant: YINGKOU DALI AUTOMOBILE MAINTENANCE EQUIPMENT S.&T.CO., LTD., Yingkou (CN)

(72) Inventors: Hai Zong, Yingkou (CN); Yuqing Wang, Yingkou (CN); Tianyi Liu, Yingkou (CN); Dezhen Zou, Yingkou (CN)

(73) Assignee: YINGKOU DALI AUTOMOBILE MAINTENANCE EQUIPMENT S.&T. CO., LTD., Yingkou (CN)

( * ) Notice: Subject to any disclaimer, the term of this patent is extended or adjusted under 35 U.S.C. 154(b) by 385 days.

(21) Appl. No.: 17/778,996

(22) PCT Filed: Apr. 9, 2020

(86) PCT No.: PCT/CN2020/083953
§ 371 (c)(1),
(2) Date: May 23, 2022

(87) PCT Pub. No.: WO2021/103378
PCT Pub. Date: Jun. 3, 2021

(65) Prior Publication Data
US 2022/0410642 A1    Dec. 29, 2022

(30) Foreign Application Priority Data
Nov. 29, 2019   (CN) .......................... 201911206531.5

(51) Int. Cl.
B60C 25/138    (2006.01)
B60C 25/05     (2006.01)

(52) U.S. Cl.
CPC ........ B60C 25/138 (2013.01); B60C 25/0563 (2013.01)

(58) Field of Classification Search
CPC ... B60C 25/13; B60C 25/0506; B60C 25/138; B60C 25/0563; B60C 25/132; F15B 15/1471
(Continued)

(56) References Cited

U.S. PATENT DOCUMENTS 3,168,130 A * 2/1965 Turpin .................. B60C 25/132
                                                    157/1.28
4,669,365 A * 6/1987 Stoll ....................... F15B 15/02
                                                    92/165 PR (Continued)

FOREIGN PATENT DOCUMENTS

CN    201366914 Y    12/2009
CN    204109706 U     1/2015
(Continued)

Primary Examiner — Bryan R Muller
(74) Attorney, Agent, or Firm — MUNCY, GEISSLER, OLDS & LOWE, P.C.

(57) ABSTRACT

The present invention discloses a tire changer including: a base; a wheel holder mounted on the base; and a tool bearing device that is arranged on the base and can drive a disassembly tool to move in the horizontal and vertical directions, and further including: a slider; a supporter; and a first driving device, wherein the supporter is fixed on the base; the tool bearing device is fixed on the slider; the first driving device is connected to the slider and the first driving device can drive the slider to slide along the vertical direction on the supporter. The tire changer has the advantages of small footprint, saving operating procedures, and improving work efficiency, etc.

4 Claims, 8 Drawing Sheets (58) Field of Classification Search
USPC ........... 74/828; 254/93 R; 92/165 R, 165 PR
See application file for complete search history.

(56) References Cited

U.S. PATENT DOCUMENTS

| | | | |
|---|---|---|---|
| 4,694,875 A * | 9/1987 | Goebel | B60C 25/132 |
| | | | 157/1.24 |
| 6,182,736 B1 | 2/2001 | Cunningham et al. | |
| 7,341,090 B2 * | 3/2008 | Gonzaga | B60C 25/138 |
| | | | 157/1.24 |
| 7,546,865 B2 * | 6/2009 | Giovannucci | B60C 25/138 |
| | | | 157/1.1 |
| 8,322,007 B2 * | 12/2012 | Gonzaga | B60C 25/138 |
| | | | 29/894.31 |
| 10,065,462 B2 * | 9/2018 | Gonzaga | B60C 25/0563 |
| 2005/0066536 A1 * | 3/2005 | Hildner | F16F 9/3207 |
| | | | 33/706 |

FOREIGN PATENT DOCUMENTS

| | | | | |
|---|---|---|---|---|
| CN | 204415061 U | 6/2015 | | |
| CN | 105751836 A | 7/2016 | | |
| CN | 206344646 U | 7/2017 | | |
| CN | 207523371 U | 6/2018 | | |
| CN | 110774840 A | 2/2020 | | |
| DE | 102004038691 A1 * | 4/2005 | .......... | F15B 15/2892 |
| EP | 1398184 A1 | 3/2004 | | |

\* cited by examiner

TIRE CHANGER

TECHNICAL FIELD

The present invention relates to the technical field of auto repair and maintenance equipment, particularly, to a tire changer.

BACKGROUND ART

A tire changer is used to mount a tire to a rim or remove a tire from a rim for repair and replacement.

The existing tire changer is generally composed of a base, a supporting column, a tool bearing device, and a wheel holder, wherein the tool bearing device is mounted on the base via the supporting column; and the wheel holder is also mounted on the base. When mounting, removing or replacing a tire, the tire needs to be mounted on or removed from the wheel holder first, however, the tool bearing device located on the upper side of the wheel hinders the above process. The existing tire changer generally adopts the following two structures in order to solve the problem that the tool bearing device hinders the process of mounting the tire to the wheel holder or removing the tire from the wheel holder. The first structure is that the supporting column and the base adopt a hinged structure, wherein the supporting column can drive the tool bearing device to tilt backward. Before the above operation, the tool bearing device can be driven to tilt backward via the supporting column to keep the tool bearing device away from the wheel holder. The second structure is that the supporting column is fixed on the base, the tool bearing device is hinged with the supporting column, and the tool bearing device can swing in the horizontal plane to keep away from the wheel holder.

The above two structures have the following shortcomings: 1. the rear inclination of the supporting column requires enough space at the rear of the tire changer, and the horizontal swing of the tool bearing device requires enough space on the side of the tire changer, and thus, these two structures both increase the footprint of the tire changer; 2. in the tire changer whose tool bearing device and supporting column are hinged, when the tool bearing device is reset after swinging horizontally, the position of the disassembly tool on the tool bearing device may have changed, and thus, it is necessary to adjust the position of the disassembly tool again to facilitate subsequent operations. This increases the workload of workers, increases the time for changing tires, and reduces the efficiency of changing tires.

SUMMARY OF INVENTION

The present invention provides a tire changer, which solves the problem that the existing tire changer needs a large footprint and has a poor efficiency of changing tires.

The technical solution adopted in the present invention is as follows.

A tire changer including: a base; a wheel holder mounted on the base; and a tool bearing device that is arranged on the base and can drive a disassembly tool to move in the horizontal and vertical directions, and further including: a slider; a supporter; and a first driving device, wherein
 the supporter is fixed on the base;
 the tool bearing device is fixed on the slider; and
 the first driving device is connected to the slider and the first driving device can drive the slider to slide along the vertical direction on the supporter. Further, a first sliding cavity is provided in the supporter; the tool bearing device is fixed on the upper end of the slider; the lower portion of the slider is arranged in the first sliding cavity; one end of the first driving device is mounted in the base and the other end of the first driving device is connected to the lower portion of the slider; and the first driving device can drive the slider to slide in the vertical direction inside the first sliding cavity.

Further, the tool bearing device is fixed on the upper end of the slider; a second sliding cavity is provided in the slider; the upper portion of the supporter is arranged in the second sliding cavity; one end of the first driving device is mounted on the base and the other end of the first driving device is connected to the slider; and the first driving device can drive the slider to slide in the vertical direction on the supporter.

Further, the tool bearing device is fixed on the slider; the second sliding cavity is provided in the slider; the upper portion of the supporter is arranged in the second sliding cavity; an accommodating cavity is provided in the supporter; the first driving device is arranged in the accommodating cavity, the lower end of the first driving device is mounted on the supporter or the base, and the other end of the first driving device is connected to the slider or the tool bearing device; and the first driving device can drive the slider to slide in the vertical direction on the supporter.

The slider is a sleeve structure; the tool bearing device is fixed on one side of the slider; the slider is sleeved on the supporter; one end of the first driving device is connected to the base or the supporter and the other end of the first driving device is connected to the slider; and the first driving device can drive the slider to slide in the vertical direction on the supporter.

Further, the tire changer includes a positioning mechanism, wherein the positioning mechanism is used to position the slider in the horizontal and vertical directions when the slider moves to the lower end.

Further, the positioning mechanism includes a first engaging piece and a second engaging piece; the first engaging piece is fixed on the side wall of the slider; the second engaging piece is arranged on the supporter; and after the slider moves downward, the first engaging piece and the second engaging piece can be engaged with each other.

Further, the tool bearing device includes a cross arm, a cross arm sheath, a cross arm locking device, a trailing arm, a trailing arm sheath, and a trailing arm locking device;
 the cross arm sheath is fixed on the upper end of the slider; the cross arm passes through the cross arm sheath and can slide axially in the cross arm sheath; one end of the cross arm fixes the trailing arm sheath; the trailing arm passes through the trailing arm sheath and can slide axially in the trailing arm sheath;
 the cross arm locking device can lock the cross arm to limit its sliding in the cross arm sheath; and
 the trailing arm locking device can lock the trailing arm to limit its sliding in the trailing arm sheath.

Further, the cross arm locking device includes a second driving device and a cross arm locking plate; the second driving device is fixed on the slider; one end of the cross arm locking plate abuts the second driving device; the other end of the cross arm locking plate is provided with a locking hole and the other end of the cross arm locking plate is limited to be positioned on the cross arm sheath in the horizontal direction; the cross arm passes through the locking hole;
 the trailing arm locking device includes a third driving device and a trailing arm locking plate; the third driving device is fixed on the cross arm; one end of the trailing arm locking plate abuts the third driving device; the other end of the trailing arm locking plate is provided with the locking hole and the other end of the trailing arm locking plate is limited to be positioned on the trailing arm sheath in the vertical direction; and the trailing arm passes through the locking hole.

Compared with the prior art, the tire changer of the present invention has the following advantages. The tool bearing device can be driven by the first driving device to move in the vertical direction away from the wheel holder, and thus, the present invention solves the problem that when a tire is mounted to or removed from the wheel holder, the tool bearing device hinders the process. At the same time, the tool bearing device only moves in the vertical direction, and thus reduces the requirement of the tire changer for footprint and improves the utilization rate of space. The movement of the tool bearing device in the vertical direction does not change the relative position of the disassembly tool to the tire, and thus, the need of re-adjusting the tool bearing device is avoided and the work efficiency of the tire changer is improved.

In the figures: 10. base, 100. accommodating space, 11. wheel holder, 2. slider, 20. second sliding cavity, 21. connecting portion, 22. sliding portion, 23. lower end surface of the connecting portion, 24. upper end surface of the supporter, 25. tapered surface, 26. gasket, 3. supporter, 30. first sliding cavity, 31. accommodating cavity, 32. pedestal, 4. first driving device, 50. first engaging piece, 51. second engaging piece, 60. cross arm, 61. cross arm sheath, 62. second driving device, 63. cross arm locking plate, 64. trailing arm, 65. trailing arm sheath, 66. third driving device, 67. trailing arm locking plate, 68. locking hole, 69. return spring, 70. disassembly tool, 71. rotating shaft.

DESCRIPTION OF EMBODIMENTS

Embodiment 1

Figure 1:
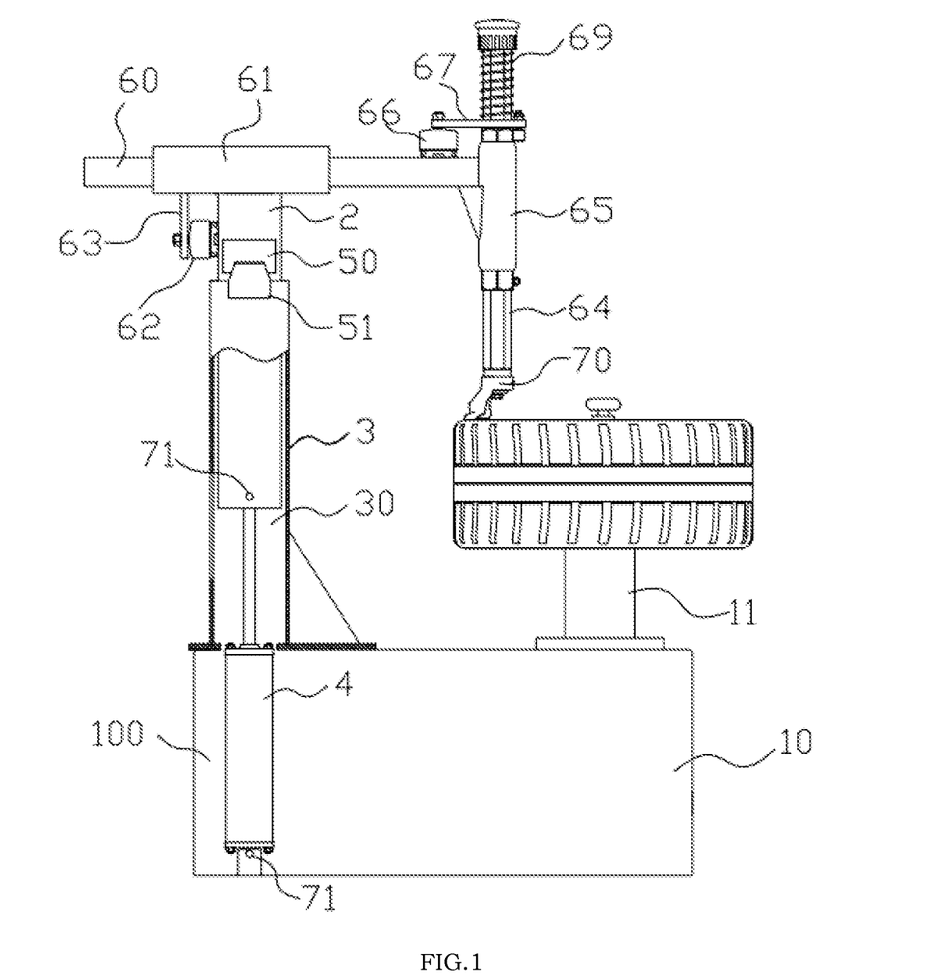
FIG. 1 is a schematic structural diagram of the embodiment 1 of the tire changer disclosed in the present invention, in which the upper bead of the tire is removed with the disassembly tool.
Figure 2:
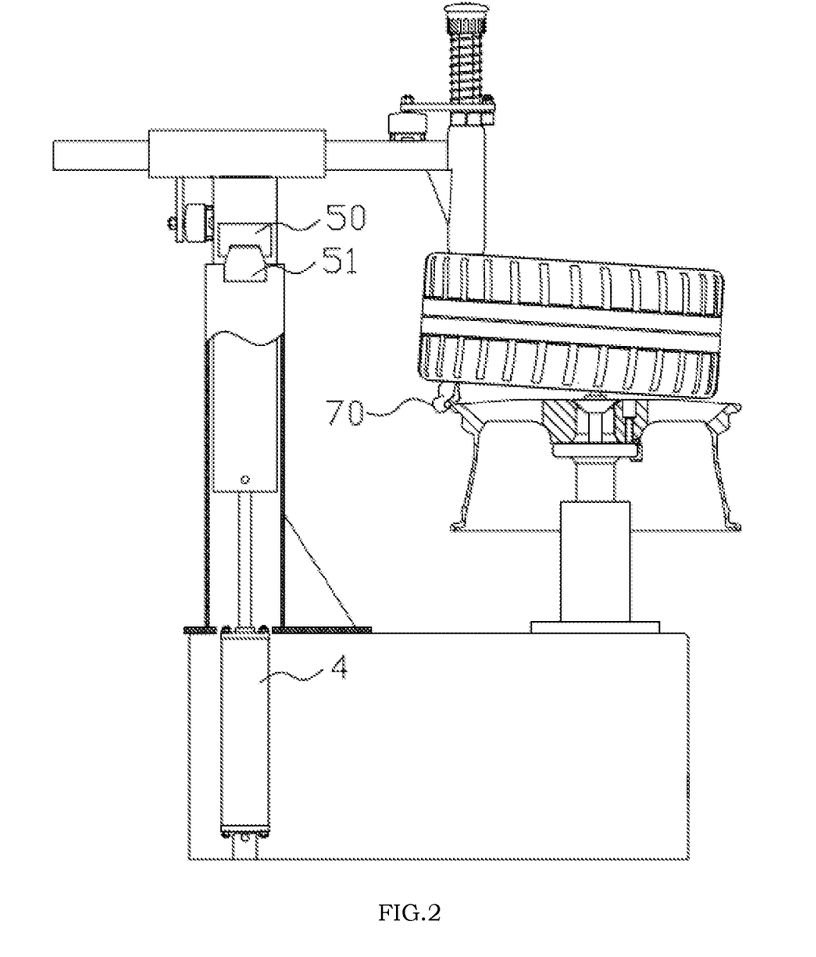
FIG. 2 is a schematic structural diagram of the tire changer disclosed in the present invention, in which the lower bead of the tire is removed with the disassembly tool.
Figure 3:
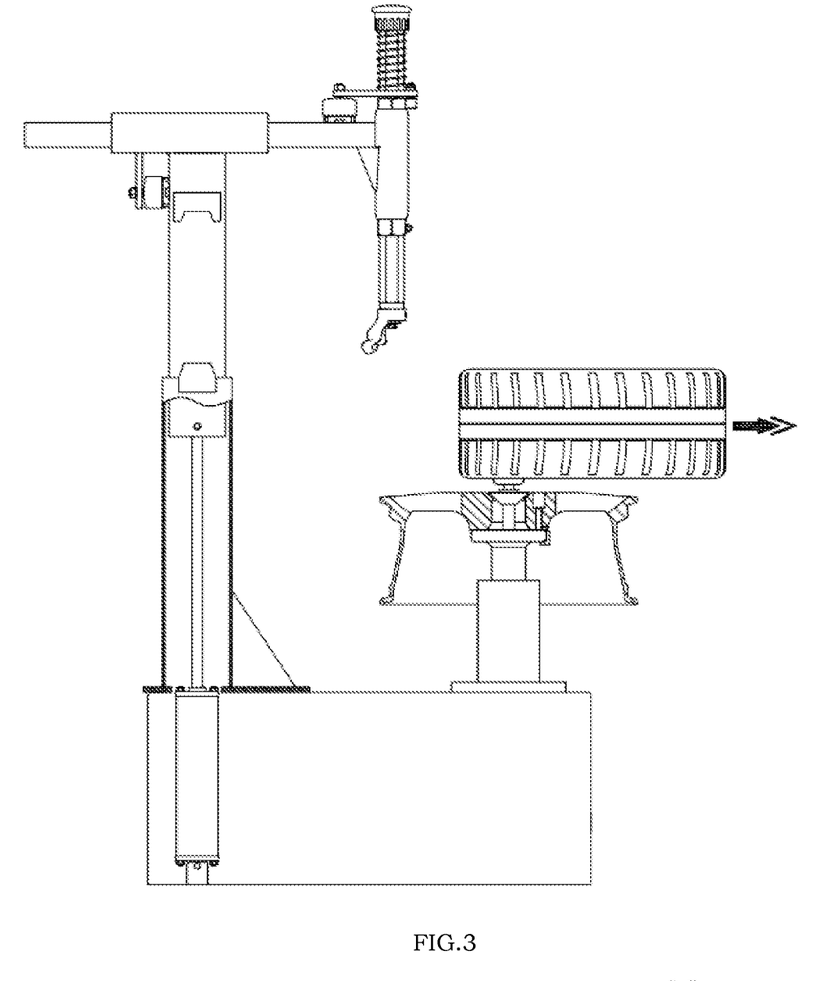
FIG. 3 is a schematic structural diagram of the tire changer disclosed in the present invention, in which the tire and the wheel holder are separated after the tool bearing device is moved to the upper end.

FIG. 1 shows the tire changer disclosed by the present invention, including: a base 10; a wheel holder 11 mounted on the base 10; a tool bearing device arranged on the base 10 to drive a disassembly tool 70 to move in the horizontal and vertical directions; a slider 2; a supporter 3; and a first driving device 4, wherein the first driving device 4 can be a linear driving device such as a pneumatic cylinder or a hydraulic cylinder; and the first driving device 4 is mounted in the base 10. In this embodiment, the first driving device is a hydraulic cylinder; the base 10 has the accommodating space 100 inside; the lower end of the hydraulic cylinder is hinged on the bottom surface of the accommodating space 100 via the rotating shaft 71; the supporter 3 is fixed on the base 10; and the first sliding cavity 30 is provided in the supporter 3. In this embodiment, the supporter 3 adopts a pipe structure with a polygonal internal perimeter (a square pipe in the figure), and the inner periphery of the pipe forms the first sliding cavity 30; the slider 2 is a polygonal prism (tube) that matches with the first sliding cavity; the tool bearing device is mounted on the upper end of the slider 2; the lower end of the slider 2 is arranged in the first sliding cavity 30 and is hinged with the end of the piston rod of the hydraulic cylinder via the rotating shaft 71; and the hydraulic cylinder can drive the slider 2 to move in the vertical direction inside the first sliding cavity 30. In the present invention, since the slider 2, the supporter 3 and the first driving device 4 are provided, the first driving device 4 can drive the tool bearing device to move in the vertical direction. As shown in FIGS. 1 and 2, when mounting the tire to the rim or separating the tire from the rim (the tire removal operation is shown in the figure), the first driving device pulls the tool bearing device to move downward, makes the disassembly tool (tire changing hook, tire shovel or tire bead hook, etc.) of the tool bearing device move to the vicinity of the tire, and adjusts the position of the tire changing tool via the tool bearing device to perform tire removing or tire mounting operations. As shown in FIG. 3, when it is necessary to remove the tire from the wheel holder or mount the tire into the wheel holder (the operation of removing the tire from the wheel holder is shown in the figure), the first driving device pushes the tool bearing device to move upward to keep the tool bearing device away from the tire, and thus eliminates the hindrance of the tool bearing device to the process. At the same time, the tool bearing device only moves in the vertical direction, and meanwhile, the first driving device can pull the slider to move downward to the initial position every time, and thereby can ensure that the tire changing tool position remains unchanged after each movement, and thus, it is no longer necessary to adjust the tire changing tool position every time, and the efficiency of tire changing is ensured. The slider is a polygonal prism, and the supporter is a sleeve structure that matches with the slider to ensure that the slider does not rotate when the slider moves relative to the supporter, and thereby ensures the movement accuracy.

Further, a positioning mechanism is also included, and the positioning mechanism is used to position the slider in the horizontal and vertical directions when the slider moves to the lower end. The positioning mechanism includes the first engaging piece 50 and the second engaging piece 51; the first engaging piece 50 is fixed on the side wall of the slider 2; and the second engaging piece 51 is arranged on the supporter 3. In this embodiment, the first engaging piece 50 is a plate with a trapezoidal groove, and the second engaging piece 51 is a plate with a trapezoidal protrusion. When the slider moves to the lower end, the trapezoidal protrusion snaps into the trapezoidal groove. The two oblique sides of the trapezoidal protrusion or trapezoidal groove are used for centering and positioning, which further ensure that the tire changing tool position (horizontal and vertical positions) remains unchanged after the tool bearing device moves up and down each time, eliminate the adjustment of the tire changing tool position, and ensure the efficiency of changing tires. Preferably, the positioning mechanism has two groups which are arranged on two opposite sides of the slider.

Figure 5A:
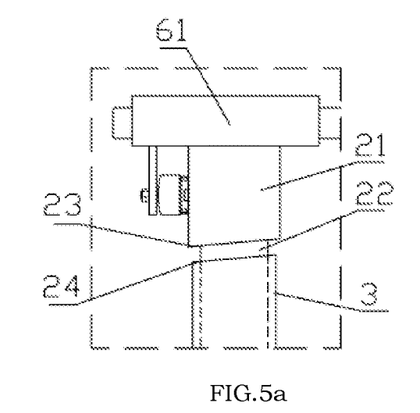
FIG. 5a is a structural diagram of the embodiment 2 of the positioning mechanism.

FIG. 5a shows the second structure of the positioning mechanism. In this embodiment, the slider 2 includes the connecting portion 21 and the sliding portion 22; the tool bearing device is fixed on the upper end of the connecting portion 21; the lower end of the connecting portion 21 is connected to the sliding portion 22; the sliding portion 22 is arranged in the first sliding cavity 20 of the supporter 3 and can slide therein; the radial dimension of the connecting portion 21 is larger than the radial dimension of the sliding portion 22; and the upper end surface 24 of the supporter is an inclined surface structure. In the figure, the wall at the rear end of the supporter is lower in height than the wall at the front end in a manner that the upper ends of the two side walls of the supporter form a slope; and the lower end surface 23 of the connecting portion (the part where the connecting portion 21 is larger than the sliding portion 22) is an inclined surface that matches with the upper end surface of the supporter. When the first driving device pulls the slider to move to the lowest position, the upper end surface of the supporter and the lower end surface of the connecting portion abut each other to achieve the positioning of the slider (the horizontal and vertical positions of the tire changing tool remain unchanged).

Figure 5B:
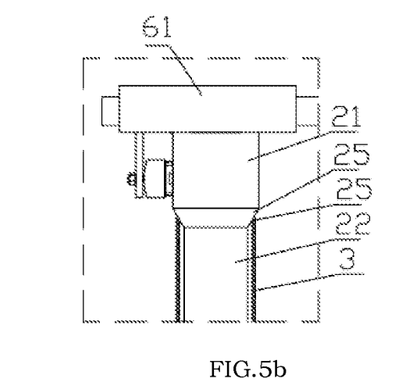
FIG. 5b is a structural diagram of the embodiment 3 of the positioning mechanism.

FIG. 5b shows the third structure of the positioning mechanism, wherein: the slider 2 includes the connecting portion 21 and the sliding portion 22; the tool bearing device is fixed on the upper end of the connecting portion 21; the lower end of the connecting portion 21 is connected to the sliding portion 22; the sliding portion 22 is arranged in the first sliding cavity 20 of the supporter 3 and can slide therein; the radial dimension of the connecting portion 21 is larger than the radial dimension of the sliding portion 22; the connecting portion and the sliding portion are transitionally connected by the tapered surface; and the tapered surface is provided on the inner wall of the upper end of the first sliding cavity of the supporter. When the first driving device pulls the slider to move to the lowest position, the tapered surface on the slider and the tapered surface on the supporter abut each other to realize the positioning of the slider (the horizontal and vertical positions of the tire changing tool remain unchanged).

Figure 5C:
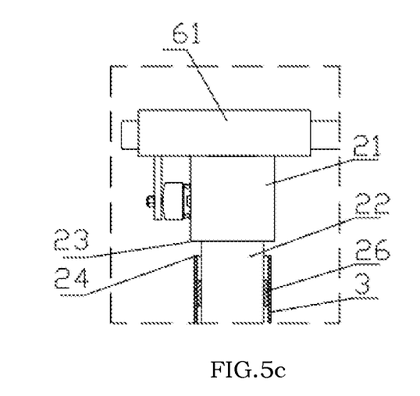
FIG. 5c is a structural diagram of the embodiment 4 of the positioning mechanism.

FIG. 5c shows the fourth structure of the positioning mechanism, wherein: the slider 2 includes the connecting portion 21 and the sliding portion 22; the tool bearing device is fixed on the upper end of the connecting portion 21; the lower end of the connecting portion 21 is connected to the sliding portion 22; the sliding portion 22 is arranged in the first sliding cavity 20 of the supporter 3 and can slide therein; the radial dimension of the connecting portion 21 is larger than the radial dimension of the sliding portion 22; gaskets are provided in the sliding portion and the first sliding cavity to adjust the gap between the two and limit the position change in the horizontal direction; and the lower end surface 23 of the connecting portion and the upper end surface 24 of the supporter are planes. When the first driving device pulls the slider to move to the lowest position, the lower end surface of the slider and the upper end surface of the supporter abut each other to realize the positioning of the slider (the horizontal and vertical positions of the tire changing tool remain unchanged).

In the present invention, the tool bearing device includes the cross arm 60; the cross arm sheath 61; the cross arm locking device; the trailing arm 64; the trailing arm sheath 65; and the trailing arm locking device, wherein both the cross arm 60 and the trailing arm 64 are polygonal prisms. In this embodiment, the cross arm is a quadrangular prism, and the trailing arm is a hexagonal prism.

The cross arm sheath 61 is fixed on the upper end of the slider 2; the cross arm 60 passes through the cross arm sheath 61 and can slide axially in the cross arm sheath 61; one end of the cross arm 60 fixes the trailing arm sheath 65; the trailing arm 64 passes through the trailing arm sheath 65 and can slide axially in the trailing arm sheath 65.

Figure 4A:
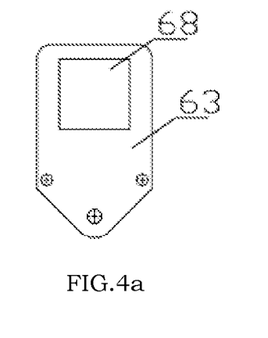
FIG. 4a is a structural diagram of the cross arm locking plate.

The cross arm locking device includes the second driving device 62 and the cross arm locking plate 63; the second driving device 62 is fixed on the slider 2; one end of the cross arm locking plate 63 abuts the second driving device 62; as shown in FIG. 4a, the other end of the cross arm locking plate 63 is provided with the locking hole 68 and the other end of the cross arm locking plate 63 is limited to be positioned on the cross arm sheath 61 in the horizontal direction; and the cross arm 60 passes through the locking hole 68.

Figure 4B:
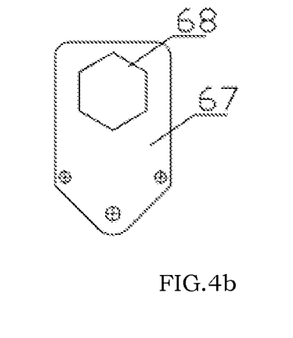
FIG. 4b is a structural diagram of the trailing arm locking plate.

The trailing arm locking device includes the third driving device 66 and the trailing arm locking plate 67; the third driving device 66 is fixed on the cross arm 60; one end of the trailing arm locking plate 67 abuts the third driving device 66; as shown in FIG. 4b, the other end of the trailing arm locking plate 67 is provided with the locking hole 68 and is limited to be positioned on the trailing arm sheath 65 in the vertical direction; and the trailing arm 64 passes through the locking hole 68. In this embodiment, the second driving device 62 and the third driving device 66 have the same structure, which can be a pneumatic cylinder, a hydraulic cylinder or other linear actuator mechanisms; and the shape of the locking hole is the same as the cross-section shape of the cross arm or trailing arm. In this embodiment, the locking hole on the cross arm locking plate is a square hole, and the locking hole on the trailing arm locking plate is a hexagonal hole. When the second driving device 62 pushes the cross arm locking plate 63 to move, the cross arm locking plate 63 is inclined and the locking hole locks the cross arm. When the second driving device 62 is reset, the cross arm can slide in the cross arm sheath. When the third driving device 66 pushes the trailing arm locking plate 67 to move, the trailing arm locking plate 67 is inclined and the locking hole locks the trailing arm. When the third driving device is reset, the trailing arm can slide in the trailing arm sheath. The trailing arm is also sleeved with the return spring 69, wherein the lower end of the return spring abuts the cross arm locking plate and the upper end of the return spring abuts the end of the trailing arm. When the third driving device is reset (the third driving device does not push the trailing arm locking plate), the trailing arm is lifted up under the action of the return spring to realize the reset of the trailing arm.

The working process of the tire changer disclosed in the present invention is as follows:
(1) mount the tire on the wheel holder: in this step, the first driving device is used to push the tool bearing device to move upward, so that the tool bearing device moves away from the wheel holder, eliminating the hindrance of the tool bearing device to the process when the tire is mounted on the wheel holder;
(2) adjust the position of the tire changing tool: after the tire is locked on the wheel holder, the first driving device pulls the tool bearing device to move downward so that the disassembly tool on the tool bearing device moves to the vicinity of the tire, and adjusts the positions of the cross arm and trailing arm of the tool bearing device and lock them so that the disassembly tool moves to the edge between the wheel and the rim;

(3) remove (mount) the tire: on the basis of the previous step, tools such as crowbars are used to remove and mount the tire (this step is an existing step, and will not be described in detail here);

(4) separate the tire from the wheel holder: the first driving device is used to push the tool bearing device to move upward, so that the tool bearing device moves away from the wheel holder, eliminating the hindrance of the tool bearing device to the process when the tire is removed from the wheel holder, and the tire and rim are removed from the wheel holder in sequence.

When removing a plurality of tires of the same model continuously, after the removal of the first tire, position adjustment of the tire changing tool is then not required in the changing process of other tires. After the tire is mounted on the wheel holder, the first driving device can directly pull the tool bearing device to move downward to a fixed position to perform the tire removal operation, and thus, the adjustment of the tire changing tool position is eliminated, the steps become less, and the efficiency of mounting and removing tires is improved.

Embodiment 2

Figure 6:
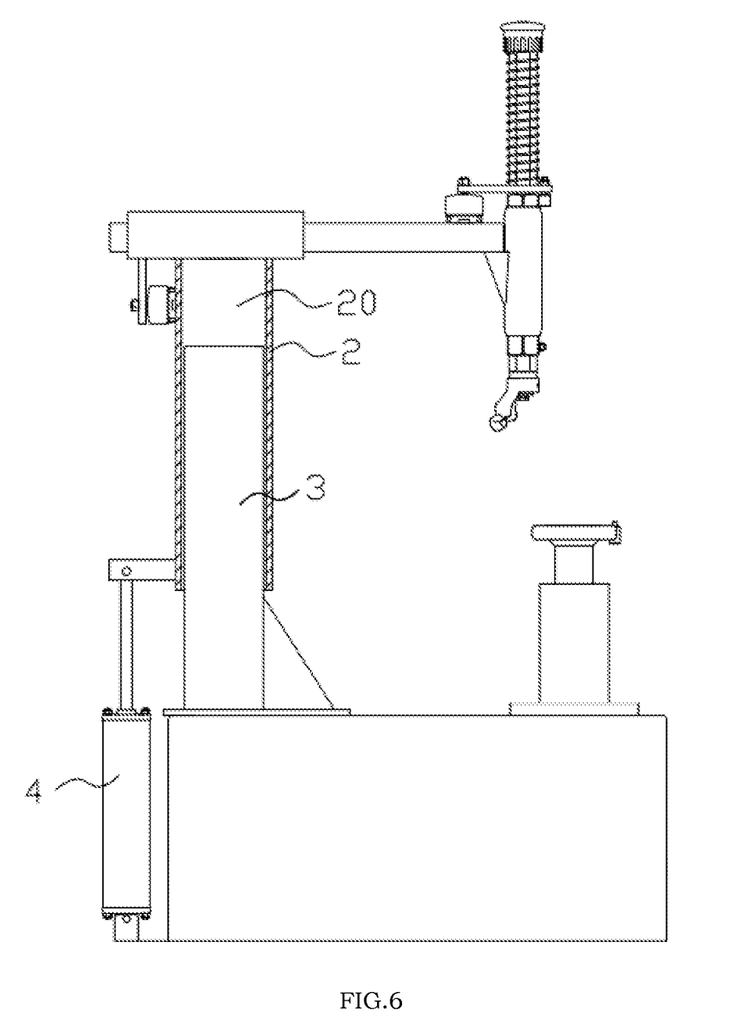
FIG. 6 is a schematic structural diagram of the embodiment 2 of the tire changer disclosed in the present invention.

FIG. 6 shows the embodiment 2 of the tire changer disclosed by the present invention. The difference between this embodiment and the embodiment 1 is that in the embodiment 1, the first sliding cavity is provided in the supporter (that is, the supporter can be a tube structure with a polygonal internal perimeter), the lower portion of the slider is arranged in the sliding cavity of the supporter (the supporter is sleeved on the slider), and the first driving device can drive the slider to slide vertically in the first sliding cavity of the supporter.

In this embodiment, the second sliding cavity 20 is provided in the slider 2. Preferably, the slider is a tube structure with a polygonal internal perimeter, the slider 2 is sleeved on the supporter 3, one end of the first driving device is mounted on the base, the other end of the first driving device is connected to the outer wall of the slider, and the first driving device can drive the slider to slide vertically on the supporter.

Embodiment 3

Figure 7:
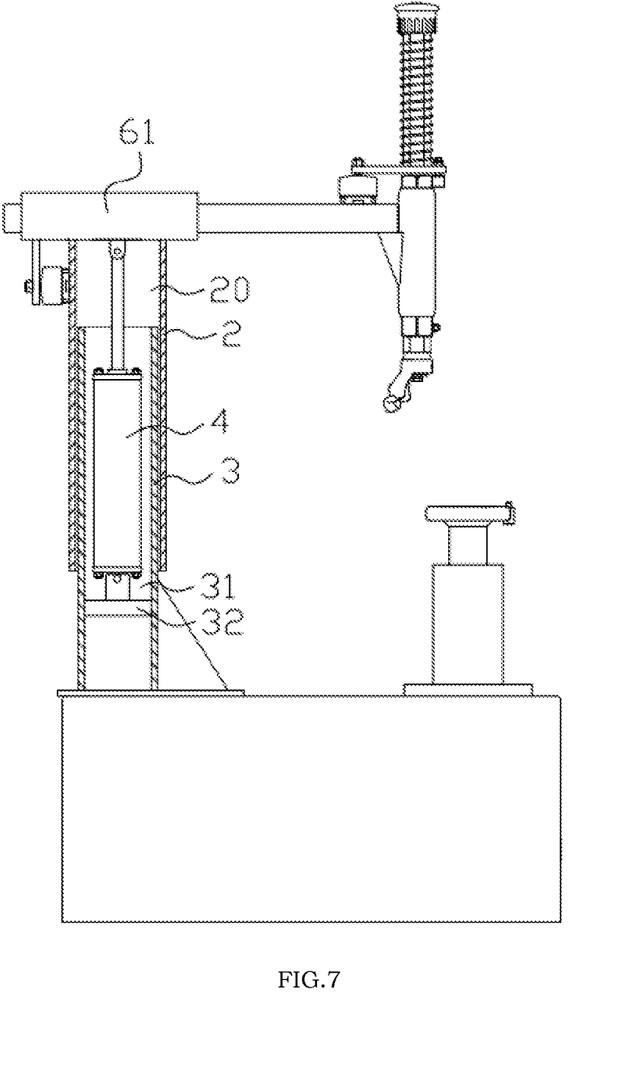
FIG. 7 is a schematic structural diagram of the embodiment 3 of the tire changer disclosed in the present invention.

FIG. 7 shows the embodiment 3 of the tire changer disclosed by the present invention. The difference between this embodiment and the embodiment 1 is that in the embodiment 1, the first sliding cavity is provided in the supporter (that is, the supporter can be a tube structure with a polygonal internal perimeter), the lower portion of the slider is arranged in the sliding cavity of the supporter (the supporter is sleeved on the slider), and the first driving device can drive the slider to slide vertically in the first sliding cavity of the supporter.

In this embodiment, the second sliding cavity 20 is provided in the slider 2, and preferably, the slider is a tube structure with a polygonal internal perimeter (the inner periphery of the tube forms the second sliding cavity); the accommodating cavity 31 is arranged in the supporter 3, and preferably, the supporter is a pipe structure whose internal perimeter is a polygon (the inner periphery of the tube forms the accommodating cavity); and the first driving device 4 is arranged in the accommodating cavity 31 and the first driving device 4 can be mounted on the supporter or directly connected to the base. In this embodiment, the first driving device is mounted on the supporter via the pedestal 32; the pedestal is a plate structure of the same shape as the internal perimeter of the supporter; the lower end of the first driving device is hinged on the pedestal via the rotating shaft; the pedestal side wall is fixedly connected to the side wall of the supporter via bolts; and the upper end of the first driving device can be connected to the slider or the tool bearing device. In this embodiment, the upper end of the first driving device is hinged with the cross arm sheath; and the first driving device can drive the tool bearing device to move vertically, thereby realizing the vertical sliding of the slider on the supporter.

Embodiment 4

Figure 8:
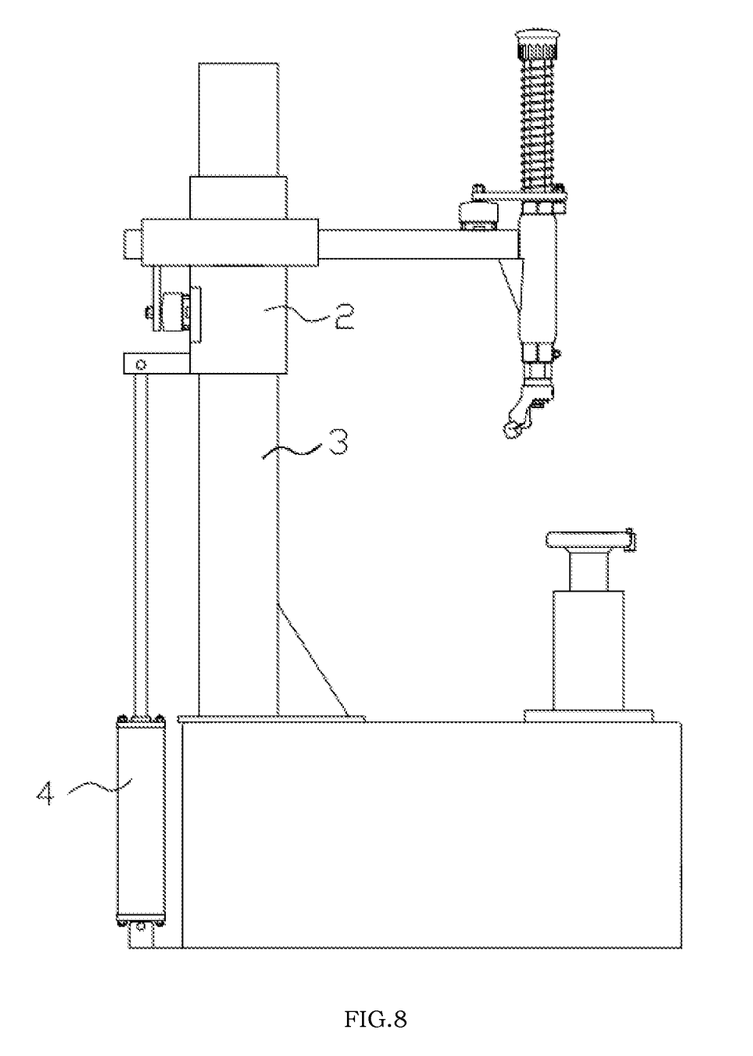
FIG. 8 is a schematic structural diagram of the embodiment 4 of the tire changer disclosed in the present invention.

FIG. 8 shows the embodiment 4 of the tire changer disclosed by the present invention. The difference between this embodiment and the embodiment 1 is that in the embodiment 1, the first sliding cavity is provided in the supporter (that is, the supporter can be a tube structure with a polygonal internal perimeter), the lower portion of the slider is arranged in the sliding cavity of the supporter (the supporter is sleeved on the slider), and the first driving device can drive the slider to slide vertically in the first sliding cavity of the supporter.

In this embodiment, the slider 2 is a sleeve structure. Preferably, the slider 2 is a tube structure with a polygonal internal perimeter; the tool bearing device is fixed on one side of the slider 2; the slider 2 is sleeved on the supporter 3; the lower end of the first driving device 4 is mounted on the base (the first driving device is mounted on the rear side of the base in the figure); the upper end of the first driving device 4 is connected to the outer wall of the slider 2; and the first driving device can drive the slider to slide vertically on the supporter.

Embodiment 5

Figure 9:
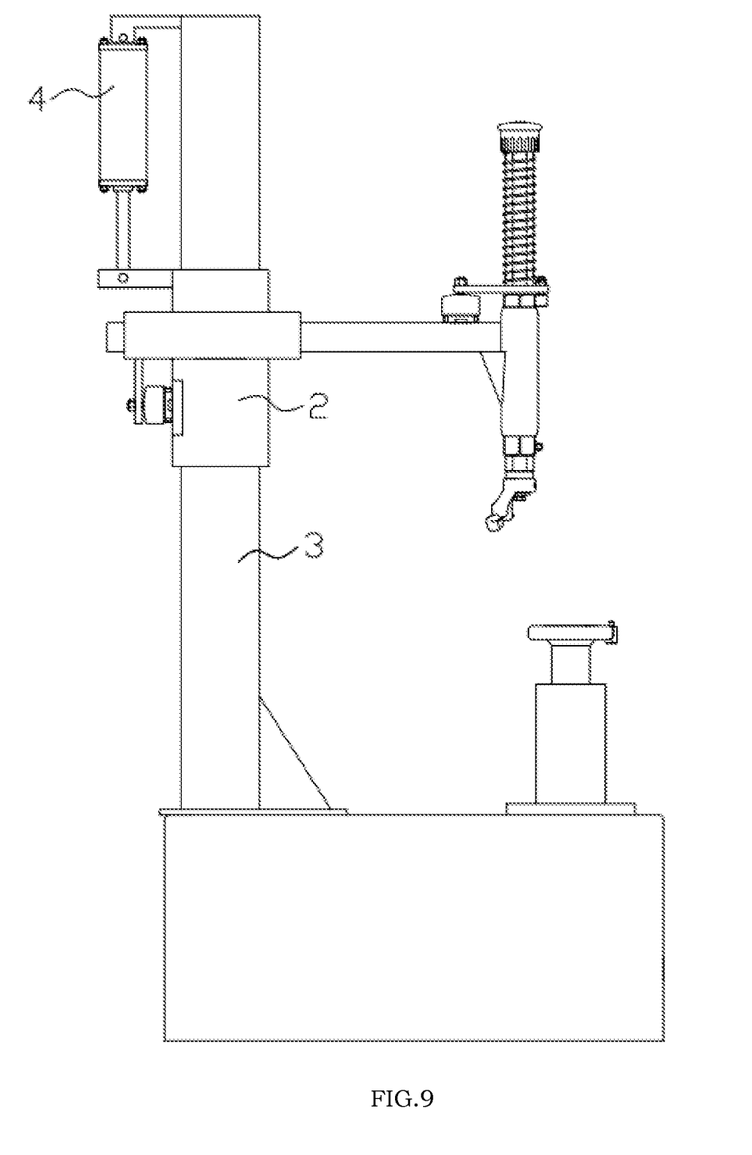
FIG. 9 is a schematic structural diagram of the embodiment 5 of the tire changer disclosed in the present invention.

FIG. 9 shows the embodiment 5 of the tire changer disclosed by the present invention. The difference between this embodiment and the embodiment 4 is that in the embodiment 4, the lower end of the first driving device is mounted on the base and the upper end of the first driving device is connected to the slider.

In this embodiment, the first driving device 4 is mounted on the upper end of the supporter 3, the lower end of the first driving device 4 is connected to the slider 2, and the first driving device can drive the slider to slide vertically on the supporter.

The above description is only a preferred embodiment of the present invention, but the protection scope of the present invention is not limited to this. Any equivalent replacements or changes made by a person skilled in the art within the technical scope disclosed by the present invention according to the technical solution of the present invention and the inventive concept thereof should be within the protection scope of the present invention.

The invention claimed is:

1. A tire changer comprising:
   a base;
   a wheel holder mounted on the base;

a tool bearing device that is arranged on the base and can drive a disassembly tool to move in the horizontal and vertical directions, wherein the tire changer includes a slider; a supporter; and a first driving device, wherein the supporter is fixed on the base;

the tool bearing device is fixed on the slider; and the first driving device is connected to the slider and the first driving device can drive the slider to slide along the vertical direction on the supporter;

wherein the tire changer includes a positioning mechanism, to position the slider when the slider moves to a lowered position;

wherein the positioning mechanism includes a first engaging piece and a second engaging piece; the first engaging piece is fixed externally on a side wall of the slider; the second engaging piece is fixed on an upper end of the supporter; the first engaging piece and the second engaging piece are respectively provided in the form of a trapezoidal protrusion and a trapezoidal groove, respectively, or the first engaging piece and the second engaging piece are respectively provided in the form of a trapezoidal groove and a trapezoidal protrusion, respectively, and wherein the trapezoidal protrusion and the trapezoidal groove are engaged with each other when the slider moves to the lowered position, such that two oblique edges of the trapezoidal protrusion and the trapezoidal groove are in contact with one another, for maintaining the position of the disassembly tool to be in both the horizontal and vertical directions.

2. The tire changer according to claim 1, wherein: a first sliding cavity is provided in the supporter; the tool bearing device is fixed on the upper end of the slider; the lower portion of the slider is arranged in the first sliding cavity; one end of the first driving device is mounted in the base and the other end of the first driving device is connected to the lower end of the slider; and the first driving device can drive the slider to slide in the vertical direction inside the first sliding cavity.

3. The tire changer according to claim 1, wherein: the tool bearing device includes a cross arm, a cross arm sheath, a cross arm locking device, a trailing arm, a trailing arm sheath, and a trailing arm locking device;

the cross arm sheath is fixed on the upper end of the slider; the cross arm passes through the cross arm sheath and can slide axially in the cross arm sheath; one end of the cross arm is fixed to the trailing arm sheath; the trailing arm passes through the trailing arm sheath and can slide axially in the trailing arm sheath;

the cross arm locking device can lock the cross arm to limit the sliding thereof in the cross arm sheath; and the trailing arm locking device can lock the trailing arm to limit the sliding thereof in the trailing arm sheath.

4. The tire changer according to claim 3, wherein: the cross arm locking device includes a second driving device and a cross arm locking plate; the second driving device is fixed on the slider; one end of the cross arm locking plate abuts the second driving device; the other end of the cross arm locking plate is provided with a locking hole and the other end of the cross arm locking plate is limited to be positioned on the cross arm sheath in the horizontal direction; the cross arm passes through the locking hole;

the trailing arm locking device includes a third driving device and a trailing arm locking plate; the third driving device is fixed on the cross arm; one end of the trailing arm locking plate abuts the third driving device; the other end of the trailing arm locking plate is provided with the locking hole and the other end of the trailing arm locking plate is limited to be positioned on the trailing arm sheath in the vertical direction; and the trailing arm passes through the locking hole.

* * * * *